United States Patent
Brinkmann et al.

(10) Patent No.: US 10,611,354 B2
(45) Date of Patent: Apr. 7, 2020

(54) METHOD FOR OPERATING A PNEUMATIC SYSTEM OF A VEHICLE

(71) Applicant: WABCO GmbH, Hannover (DE)

(72) Inventors: Stefan Brinkmann, Wunstorf (DE); Konrad Feyerabend, Hannover (DE); Bernd Strilka, Hannover (DE)

(73) Assignee: WABCO GmbH, Hannover (DE)

( * ) Notice: Subject to any disclaimer, the term of this patent is extended or adjusted under 35 U.S.C. 154(b) by 503 days.

(21) Appl. No.: 15/310,881

(22) PCT Filed: Feb. 14, 2015

(86) PCT No.: PCT/EP2015/000331
§ 371 (c)(1),
(2) Date: Apr. 7, 2017

(87) PCT Pub. No.: WO2015/172858
PCT Pub. Date: Nov. 19, 2015

(65) Prior Publication Data
US 2017/0203742 A1    Jul. 20, 2017

(30) Foreign Application Priority Data

May 14, 2014    (DE) .................. 10 2014 007 046
Sep. 26, 2014   (DE) .................. 10 2014 014 451

(51) Int. Cl.
| | |
|---|---|
| *F04B 39/06* | (2006.01) |
| *B60T 17/02* | (2006.01) |
| *B60T 17/00* | (2006.01) |

(52) U.S. Cl.
CPC ........... *B60T 17/02* (2013.01); *B60T 17/004* (2013.01); *F04B 39/06* (2013.01); *F04B 39/068* (2013.01)

(58) Field of Classification Search
CPC ........ B60T 17/02; B60T 17/004; F04B 39/06; F04B 39/068
See application file for complete search history.

(56) References Cited

U.S. PATENT DOCUMENTS

| | | | | |
|---|---|---|---|---|
| 4,436,064 A | * | 3/1984 | Lamkewitz | ........ B60H 1/00878 123/142.5 E |
| 5,114,315 A | | 5/1992 | Kaltenthaler et al. | |

FOREIGN PATENT DOCUMENTS

| | | |
|---|---|---|
| DE | 3923882 A1 | 9/1990 |
| DE | 19627403 A1 | 1/1998 |

(Continued)

OTHER PUBLICATIONS

PCT/EP2015/000331 International Search Report dated Nov. 13, 2015, 4 pages.

(Continued)

*Primary Examiner* — Peter J Bertheaud
*Assistant Examiner* — Dnyanesh G Kasture
(74) *Attorney, Agent, or Firm* — Warner Norcross + Judd LLP

(57) ABSTRACT

A method for operating a pneumatic system of a vehicle is disclosed. The pneumatic system comprises an electronically and/or pneumatically controlled compressor which supplies compressed air during a normal mode and which is switched off or idles when not supplying compressed air. In the method, an ambient temperature (T_Umg) around the pneumatic system is continuously sensed and compared with a predefined target temperature (T_Ziel), a freezing risk is detected when the ambient temperature (T_Umg) reaches or drops below the target temperature (T_Ziel), and when a freezing risk has been detected, a cold mode is activated in which the compressor delivers compressed air also outside delivery phases of the normal mode, and additional compressed air is supplied to pneumatic system components that risk freezing. An additional ON time (ED_zus) of the compressor in the cold mode is variably controlled.

11 Claims, 2 Drawing Sheets

(56) References Cited

FOREIGN PATENT DOCUMENTS

| | | |
|---|---|---|
| DE | 102008003957 A1 | 12/2008 |
| DE | 102010011571 A1 | 9/2011 |
| EP | 1318346 A2 | 6/2003 |
| EP | 1998065 A2 | 12/2008 |
| EP | 2123343 A1 | 11/2009 |

OTHER PUBLICATIONS

English language abstract and machine translation for DE19627403 (A1) extracted from http://worldwide.espacenet.com database on Aug. 19, 2016, 13 pages.
English language abstract and machine translation for EP1998065 (A2) extracted from http://worldwide.espacenet.com database on Aug. 19, 2016, 27 pages.
English language abstract and machine translation for DE102008003957 (A1) extracted from http://worldwide.espacenet.com database on Aug. 19, 2016, 27 pages.
English language abstract and machine translation for EP2123343 (A1) extracted from http://worldwide.espacenet.com database on Aug. 19, 2016, 16 pages.
English language abstract and machine translation for DE102010011571 (A1) extracted from http://worldwide.espacenet.com database on Aug. 19, 2016, 12 pages.

* cited by examiner

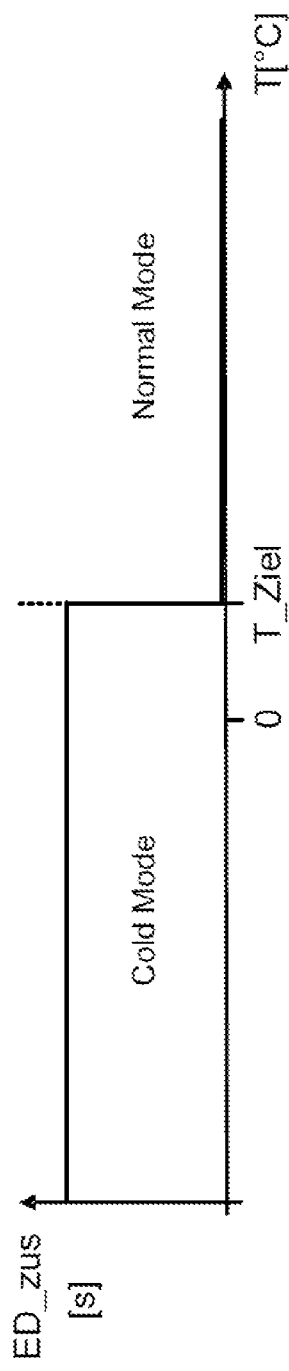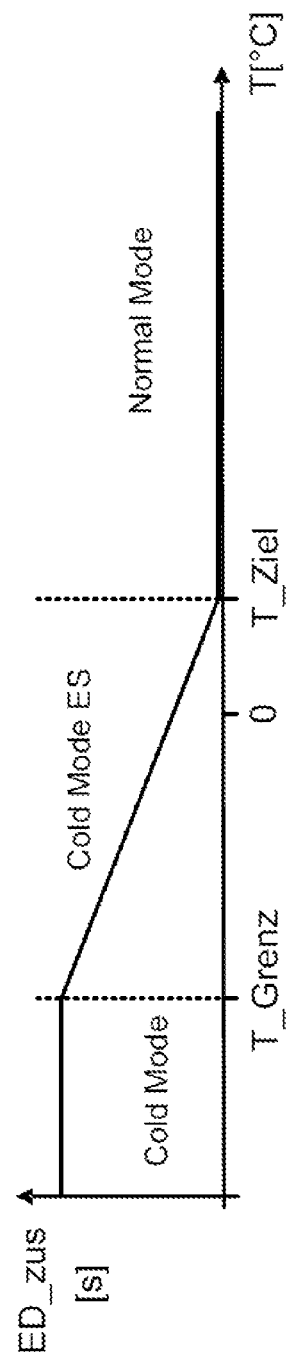

METHOD FOR OPERATING A PNEUMATIC SYSTEM OF A VEHICLE

CROSS-REFERENCE TO RELATED APPLICATIONS

This application is the National Stage of International Application No. PCT/EP2015/000331, filed on 14 Feb. 2015, which claims priority to and all advantages of German Patent Application No. 10 2014 007 046.8, filed on 14 May 2014, and German Patent Application No. 10 2014 014 451.8, filed on 26 Sep. 2014, the contents of which are hereby incorporated by reference.

FIELD OF THE INVENTION

The present invention generally relates to a method for operating a pneumatic system of a vehicle and, more specifically, to a method for operating a pneumatic system having a normal mode and a cold mode.

BACKGROUND OF THE INVENTION

Known pneumatic systems for vehicles, in particular for commercial vehicles, operate with a compressor that, controlled by an electronic control device of a compressed air supply system, compresses air drawn in from the atmosphere. The control device switches the compressor on for supply phases if compressed air is required in the pneumatic system, and off for idle phases when no further compressed air supply is necessary. The supplied compressed air is provided to different devices of the vehicle as required, such as brake systems and auxiliary units. For dehumidifying the compressed air, as a rule an air drying device with a replaceable moisture absorbing cartridge is provided. In order to remove the water collected there, from time to time in a so-called regeneration process dry air from the pneumatic system is passed in the opposite direction through the air drying device and is discharged into the surroundings by means of a venting valve. At low temperatures, however, freezing of the precipitated water can occur in the region of the air drying device, in particular at the venting valve. As a result, malfunctions in the pneumatic system can be caused.

In order to prevent icing of the pneumatic system at low temperatures or to melt an already existing ice formation, a controllable heating element can be disposed on the air drying device, which is energized as required and prevents ice formation by giving off heat. However, such a heating element increases the costs of manufacture of the pneumatic system and the heater operation increases the energy consumption of the vehicle. It is also known to switch over the pneumatic system into a so-called cold mode by means of the control device for compressed air supply to protect against icing at low ambient temperatures. In the cold mode the compressor is switched to continuous operation by means of a simple control function, at least for a fixed predetermined period of time. The compressed air that is heated by the compression process in the compressor gives off heat to the air drying device during this, so that the components at risk of freezing do not ice up. However, additional compressed air is produced by the temporary continuous operation in the cold mode that is not always required by the pneumatic system. The excess compressed air can be discharged to the surroundings by opening the venting valve. By feeding in warm compressed air and discharging warm compressed air, the system components, in particular the venting valve, are also kept working at low temperatures. However, the temporary additional continuous operation of the compressor increases the wear thereof and the energy consumption of the pneumatic system.

An air drying device of a pneumatic system for vehicles and a method for preventing ice formation on a venting valve device of such an air drying device are generally known. For example, the air drying device may comprise a compressor connector for connecting a compressor, a venting connector for connecting the air drying device to the atmosphere by means of the selectively opened or closed venting valve device and a working connector of the pneumatic system. With the venting valve device closed, compressed air supplied by the compressor to the compressor connector is conveyed into the pneumatic system by means of the working connector. With the venting valve device opened, compressed air supplied by the compressor to the compressor connector is discharged into the atmosphere, wherein the compressed air heated in the compressor is fed to the venting valve device by a direct flow path without any detours. The warm compressed air is supplied to the venting valve device as required, in particular at low temperatures, as a preventative measure to protect against icing.

SUMMARY OF THE INVENTION

It is one object of the invention to provide a method for operating a pneumatic system for vehicles that can be manufactured inexpensively and that prevents the icing of components of the pneumatic system in an energy saving and reliable manner.

Generally, for an energy saving mode of a pneumatic system of a vehicle, a compressor that is used for producing and supplying the compressor is only run in the supply mode if actually necessary to supply the pneumatic system. If additional compressed air is produced and used in order to prevent icing up of an air drying device with a venting valve device of the pneumatic system, the compressor should only be additionally switched on for as long as is necessary to achieve a suitable increase in temperature of the components at risk of freezing. The minimum necessary additional supply phases or the equivalent maximum enabled idle phases of the compressor can be calculated as a target and can be variably controlled with a suitable algorithm that takes into account the thermal behavior of the components at risk of freezing depending on the ambient temperature.

The invention is a method for operating a pneumatic system of a vehicle with an electronically and/or pneumatically controlled compressor, which supplies compressed air in a normal mode as required to supply the pneumatic system and which outside the supply phases is switched off or is in an idle mode in which an ambient temperature of the pneumatic system is continuously detected and compared with a predetermined target temperature at which a risk of freezing is detected if the ambient temperature reaches or drops below the target temperature. A cold mode is activated on detecting a risk of freezing, wherein the compressor supplies compressed air in the cold mode in addition to the required supply phases of the normal mode, which is fed to components at risk of freezing of the pneumatic system to heat the same and then is additionally supplied to the pneumatic system or discharged into the surroundings. In order to achieve the stated object, the invention provides that an additional switch-on duration of the compressor in the cold mode is variably controlled at least in a predetermined ambient temperature range and is determined in each case depending on the temperature difference between the ambient temperature and the target temperature.

An ambient temperature means a temperature in the immediate surroundings of the pneumatic system. The ambient temperature can for example be detected on a housing of the pneumatic system.

A target temperature means an ambient temperature that lies above the freezing temperature of water by a safety margin.

A normal mode means an operating mode above the target temperature during which the compressor supplies compressed air for the pneumatic system as required.

An idle mode of the compressor or a switched off compressor means that the compressor is not supplying any compressed air. Switching on the compressor means that the compressor is brought into an operating mode in which it supplies compressed air, wherein a switch-on duration is a period of time in which the compressor supplies compressed air.

A cold mode means an operating mode below the target temperature, during which the compressor is switched on regardless of the demand-dependent supply phases if components of the pneumatic system are icing up or can ice up and this is detected.

In an energy saving cold mode (Cold Mode ES), according to the invention temperature-related switched-on phases of the compressor can be variably controlled. As a result, in comparison to the known control of the compressor with standard continuous operation phases, on average a shorter demand-driven compressor switch-on duration can be achieved. This reduces the energy consumption and thus has a cost-saving and environmentally friendly effect.

The compressor supplies compressed air into the pneumatic system in the normal mode at ambient temperatures above the target temperature only as required. The compressed air can be tapped by the connected consumers, for example a pneumatic brake system of a commercial vehicle, at a working connector of the compressor.

When the compressor is not required or is not intended to supply, it is switched off or placed into an idle mode, wherein it is switched off via a valve device and/or is decoupled via a clutch from the drive train of the vehicle in order to consume the minimum possible energy or fuel.

A control device of the electronically controlled compressor changes from a "Normal Mode" algorithm into a "Cold Mode" algorithm at an ambient temperature below the target temperature. For this purpose, a pneumatic system usually comprises a temperature sensor arrangement, which for example detects a housing temperature in the proximity of a venting valve and interprets the temperature approximately as the ambient temperature. At a point with a risk of freezing the temperature may already have reached the freezing point of water, although the temperature sensor arrangement is still measuring a somewhat higher temperature. Therefore, a target temperature is assumed as the freezing temperature that is a few degrees above 0° C. As a result, it is taken into account that the temperature sensor arrangement is not necessarily measuring the temperature directly at a point with a risk of freezing but at distance from the point.

With conventional methods, the compressor is switched on on detecting the risk of freezing, at least for a specified period of time of the order of minutes until the temperature of the components at risk of freezing has reached the target temperature. As a result, the compressor supplies additional compressed air, which is heated according to the thermodynamic state equation for gases during the compression process owing to the rising gas pressure. In these conventional methods, the supplied compressed air is only used to heat the components at risk of freezing that are disposed in particular in the region of a usually present air drying device, and as a rule escapes into the surroundings via a discharge or venting valve.

The type of heating of the components that are at risk of freezing increases the switch-on duration of the compressor, wherein owing to the standard time control of the compressor mode in the temperature range below the target temperature an increase in the temperature at the discharge or venting valve can tend to occur and thereby an unnecessarily high energy consumption can occur. Depending on the climatic conditions under which the vehicle is mainly used, a fixed predetermined switch-on duration also tends to be short, so that additional switch-on processes of the compressor can occur that are repeated in quick succession or that are regularly too frequent.

The previously known controls can be improved by the invention with a new energy saving control algorithm known as "Cold Mode ES". The algorithm takes into account that the respective switch-on duration of the compressor that is actually required to reach the target temperature depends on the ambient temperature and the resulting difference that is to be bridged between the ambient temperature and the freezing temperature, or the difference that is to be bridged between the ambient temperature and the predetermined target temperature.

As a result, the energy demand for the compressor mode of the vehicle that is intended to prevent freezing of the relevant components is reduced to a minimum. At the same time, the number of switch-on processes and switch-off processes of the compressor can be reduced by replacing many continuous operation phases of standard length by fewer specific continuous operation phases of flexible length. As a result, more costs can be saved and the wear on the pneumatic system can be reduced. In particular, the service life of a clutch for switchable connection of the compressor to a drive motor can be increased. The method according to the invention can be implemented in an already provided control device. If a suitable temperature sensor arrangement is present in the vehicle or on the pneumatic system, no additional devices are even necessary.

In specific embodiments of the method according to the invention, a control algorithm can be performed that comprises at least the following steps:
 determining a temperature difference between the ambient temperature and the target temperature,
 determining a total compressor switch-on duration that is necessary for the cold mode as a function of the determined temperature difference,
 detecting an actual completed compressor switch-on duration for supply of the pneumatic system,
 determining an additional compressor switch-on duration from the difference of the necessary compressor switch-on duration and the actual compressor switch-on duration.

Therefore, the energy saving cold mode (Cold Mode ES) is activated if it is determined that an ambient temperature lies below the predetermined target temperature. Based on the determined temperature difference, a switch-on duration of the compressor is determined that is sufficient to reach the target temperature. During this the compressor switch-on duration of the supply phases required by the pneumatic system is taken into account. As the value for the actual compressor switch-on duration, an actual switch-on duration and/or an average value over a number of switching cycles of the compressor can be used as a parameter for calculation.

The assignment of a respectively necessary switch-on duration to the detected temperature difference can for example be taken from a characteristic field or a characteristic table that has been determined empirically in advance and is stored in a memory of a control device of the pneumatic system.

One such characteristic field or characteristic table implies the thermal behavior and the cooling behavior of the components at risk of freezing of the pneumatic system. This includes: the thermal transfer properties, i.e. the parameters thermal capacity, thermal conductivity and thermal radiation of the components at risk of freezing of the pneumatic system as well as of components in the vehicle that are disposed adjacent to the components and that also influence the thermal behavior and the cooling behavior of the components at risk of freezing, such as for example the temperature of the drive motor and gearbox of the vehicle, as well as the flow and thermal parameters of the compressed air flow that acts upon the components at risk of freezing.

Explicitly, for determining a necessary total compressor switch-on duration for the cold mode one or more of the parameters that are relevant to thermal transfer, including: installation location, geometry and material properties of the components at risk of freezing, the geometry of a flow path between the compressor and the components at risk of freezing as well as a vehicle speed-dependent airflow or variables that are dependent thereon can be taken into account.

Furthermore, it can be provided that with the method the ambient temperature range in which the additional compressor switch-on duration is variably controlled is determined by a lower and an upper temperature limit, wherein the upper temperature limit is the target temperature, wherein the compressor is operated in the normal mode at ambient temperatures above the target temperature and is operated in the continuous mode below the lower temperature limit at least for a fixed predetermined period of time.

The variable control of the compressor in the cold mode can be used particularly efficiently in a transition region from a few degrees about the freezing limit and results in significant savings there by a shorter switch-on duration in each case. The method can also be advantageously combined with the previously used methods by using a previously determined continuous operation below a temperature limit at temperatures significantly below the freezing temperature and if necessary extending the continuous operation beyond the specified period of time.

Moreover, it can be provided that in the case of a re-start of the vehicle, initially a warm-up phase of the pneumatic system is carried out that is dependent on the ambient temperature and/or the engine temperature and/or the cooling water temperature. This can for example be implemented by way of a temporary continuous operation of the compressor. As a result, in particular at very low ambient temperatures the pneumatic system can be prevented from freezing at the start of the journey.

Moreover, it can be provided that in an engine braking mode of a vehicle drive engine that is driving the compressor, a current idle phase of the compressor in the cold mode is temporarily interrupted. As a result, the compressor can be driven without additional fuel consumption in order to increase the temperature of the components at risk of freezing of the pneumatic system.

Finally, it can be provided that owing to a separate externally triggered request, a currently existing idle phase of the compressor is interrupted and the normal mode of the compressor is switched on. An externally triggered request can be one that was effected by the driver of the motor vehicle by manually operating a switch or a control slider.

BRIEF DESCRIPTION OF THE DRAWINGS

The invention is described in greater detail below with reference to the accompanying drawing figures, in which:

FIG. 1 shows a circuit diagram of a compressor of a pneumatic system according to the prior art;

FIG. 2 shows a circuit diagram of a compressor of a pneumatic system according to the method according to the invention.

DETAILED DESCRIPTION

Figure 3:
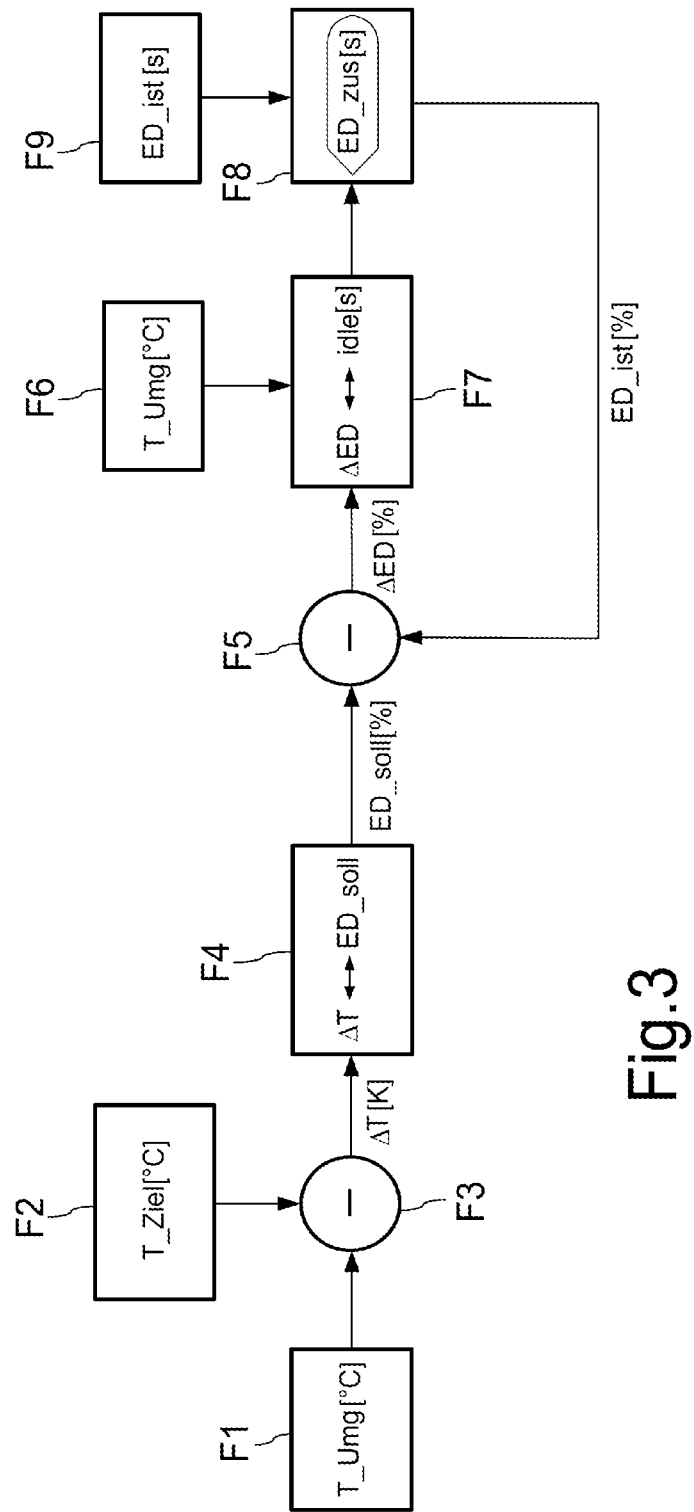
FIG. 3 shows a block diagram of a control algorithm according to one embodiment of the method according to the invention.

A pneumatic system (that is not shown) of a motor vehicle comprises a compressor, an air drying device with a venting valve device, compressed air lines, a temperature sensor as well as an electronic control device. The compressor produces compressed air for compressed air consumers that can be connected to a working connector, such as for example a pneumatic brake system of a commercial vehicle. Such a brake system comprises one or a plurality of compressed air reservoir containers that are supplied by the compressor. The air drying device extracts moisture from the compressed air, which collects as water and is regularly discharged into the surroundings via a venting valve. The air drying device with the venting valve device is at risk of freezing at low ambient temperatures owing to the precipitated moisture. The temperature sensor detects a housing temperature of the pneumatic system, which approximately corresponds to the ambient temperature. The venting valve device and the temperature sensor can be arranged in different equipment assemblies depending on the design, so that the detected temperature and the actual temperature of the components at risk of freezing can be somewhat different. Therefore, a target temperature above 0° C. is specified as a safety-relevant temperature value for detecting a risk of freezing.

With a conventional method according to the prior art, in a "Normal Mode" at ambient temperatures above the target temperature, for example T_Ziel=+2° C., the compressor supplies compressed air into the pneumatic system only if required. Outside the supply phases, the compressor is in an idle mode. In order to switch off and switch on the compressor or to switch between an idle mode and a delivery mode, the compressor can be decoupled from the drive shaft of a drive motor or coupled thereto for drive purposes, for example via a clutch.

From ambient temperatures below 0° C., or below the target temperature increased by a safety margin, an algorithm controlling the pneumatic system changes from "Normal Mode" to a "Cold Mode" and the compressor is switched on for continuous operation at least for a specified certain minimum period of time, for example for two minutes. The compressor now supplies additional compressed air that is heated during the compression process. The compressed air is only used to heat the components at risk of freezing that are disposed in the region of the air drying device, and escapes into the surroundings via a discharge valve. The additional supply phase or discharge phase lasts at least for the specified period of time, i.e. two minutes, even if there is an actual increase in temperature in comparison to the target temperature at the venting valve within the period of time. FIG. 1 shows the additional constant switch-on duration ED_zus. At temperatures above the target temperature T_Ziel, the compressor is not additionally switched on. The fixed period of time for the discharge phase can however result in the compressor only changing to the normal mode or being switched off above the target temperature T_Ziel.

In contrast, the method according to the invention enables an additional variable compressor switch-on duration ED_zus in the cold mode that is adapted to the ambient conditions. This is illustrated using FIG. 2. Therefore, in a "Cold Mode ES" operating mode the idle phases or the additional supply phases or discharge phases are calculated depending on the temperature difference between the ambient temperature and the target temperature T_Ziel such that the length of the respectively necessary discharge phases is only as long as is necessary to achieve the corresponding increase in temperature at the components that are at risk of freezing. The closer the ambient temperature to the target temperature T_Ziel, the lower is the determined additionally required switch-on duration in order to achieve the target temperature T_Ziel.

At very low temperatures, for example below a temperature limit T_Grenz=−6° C., the control switches from the flexible "Cold Mode ES" operating mode back to the quasi constant "Cold Mode" operating mode. Energy savings can be achieved in the compressor operation owing to the ramp-like transition of the compressor switch-on duration ED_zus between the temperature limit T_Grenz and the target temperature T_Ziel shown in FIG. 2, which results from the implicit accounting for the cooling and heating behavior of the components at risk of freezing when calculating the additional switch-on duration ED_zus of the compressor.

FIG. 3 shows in a block diagram an exemplary embodiment of an implementation of a control algorithm of the method in an existing controller of a pneumatic system of a vehicle.

The switch-on duration ED of the compressor is initially converted into a relative computing variable according to ED=(pump+dump)/(pump+dump+idle) [%], wherein "pump" stands for the supply phase, "dump" stands for the discharge phase and "idle" stands for the idle phase. In the purely continuous mode ED=1, in the purely idle mode ED=0.

In a first block F1 of the control algorithm, the ambient temperature T_Umg is detected. In a second block F2 the target temperature T_Ziel is predetermined. In a third block F3 the temperature difference ΔT is formed therefrom. In a fourth block F4, using a table a necessary switch-on duration ED_soll of the compressor is assigned to the determined temperature difference ΔT. The determined necessary relative switch-on duration ED_soll [%] is used as an input variable in a downstream control circuit. The value of the actual switch-on duration ED_ist [s] of the compressor is passed from a ninth block F9 to an eighth block F8. In the eighth block F8 the actual switch-on duration ED_ist [s] of the compressor is detected and converted to a relative switch-on duration ED_ist [%]. Then the relative switch-on duration ED_ist [%] is passed a fifth block F5. In the fifth block F5, the difference ΔED [%] of the two relative switch-on durations ED_soll [%], ED_ist [%] is formed. In a sixth block F6 the ambient temperature T_Umg is provided to a seventh block F7. In the seventh block F7 in a further table the relative switch-on duration difference ΔED [%] is aligned with an absolute permitted idle phase idle in seconds depending on the ambient temperature T_Umg. The calculation of the length of a discharge phase or an additional supply phase of the compressor is finally given by the difference ΔED between the necessary compressor switch-on duration ED_soll and the actual compressor switch-on duration ED_ist, the length of the current supply phase and the permissible idle phase depending on the ambient temperature T_Umg. This gives an absolute additional switch-on duration ED_zus, which for example can vary between zero seconds and two minutes and is provided in block F8 for the control of the operation of the compressor. The compressor is additionally operated in the "Cold Mode ES" for the period of time of the calculated switch-on duration ED_zus in order to prevent freezing of the components of the pneumatic system that are at risk of freezing.

REFERENCE CHARACTERS AND ABBREVIATIONS (PART OF THE DESCRIPTION)

dump compressor discharge phase
ED compressor switch-on duration
ED_ist actual compressor switch-on duration
ED_soll necessary compressor switch-on duration
ED_zus additional compressor switch-on duration
ΔED switch-on duration difference between ED_soll and ED_ist
F1 through F9 function blocks
idle compressor idle phase
pump compressor supply phase
T temperature
T_Grenz temperature limit
T_Umg ambient temperature
T_Ziel target temperature
ΔT temperature difference between T_Ziel and T_Umg

What is claimed is:

1. A method for operating a pneumatic system of a vehicle with an electronically and/or pneumatically controlled compressor, the compressor having a normal mode which supplies compressed air to the pneumatic system, the normal mode being switched off or the compressor being in an idle mode when not supplying compressed air, said method comprising:
    detecting an ambient temperature (T_Umg) exterior to the pneumatic system and continuously comparing the ambient temperature (T_Umg) with a predetermined target temperature (T_Ziel),
    detecting a risk of freezing if the ambient temperature (T_Umg) reaches or drops below the predetermined target temperature (T_Ziel),
    activating a cold mode upon detecting the risk of freezing, wherein in the cold mode in addition to the normal mode the compressor supplies compressed air that is fed to components at risk of freezing of the pneumatic system to heat them, the compressed air being additionally provided to the pneumatic system or discharged into the surroundings, wherein a variable switch-on duration (ED_zus) of the compressor is variably controlled in the cold mode if the ambient temperature (T_Umg) is within a predetermined ambient temperature range and is determined depending on a temperature difference (ΔT) between the ambient temperature (T_Umg) and the predetermined target temperature (T_Ziel), the switch-on duration (ED_zus) of the compressor being a fixed time period if the ambient temperature (T_Umg) is below the predetermined ambient temperature range, wherein the variable switch-on duration (ED_zus) increases from zero to the fixed switch-on duration (ED_zus) in proportion to the difference between the ambient temperature (T_Umg) and the predetermined target temperature (T_Ziel), and returning the compressor to the idle mode, or switching off the compressor, after the variable switch-on duration and after the fixed switch-on duration.

2. The method as claimed in claim 1, including a control algorithm, which comprises:

determining the temperature difference (ΔT) between the ambient temperature (T_Umg) and the target temperature (T_Ziel), determining a total compressor switch-on duration (ED_soll) for the cold mode depending on the determined temperature difference (ΔT), detecting an actually completed compressor switch-on duration (ED_ist) for supplying the pneumatic system, and determining an additional compressor switch-on duration (ED_zus) from the difference of the total compressor switch-on duration (ED_soll) and the actually completed compressor switch-on duration (ED_ist).

3. The method as claimed in claim 2, wherein one or more parameters relevant to thermal transfer, selected from installation location, geometry and material properties of components at risk of freezing, geometry of a flow path between the compressor and components at risk of freezing and vehicle speed-dependent airflow, or variables that are dependent thereon, are taken into account in determining a total compressor switch-on duration (ED_soll) for the cold mode.

4. The method as claimed in claim 1, wherein the ambient temperature range in which the additional compressor switch-on duration (ED_zus) is variably controlled is determined by a lower and an upper temperature limit, wherein the upper temperature limit is the target temperature (T_Ziel), wherein the compressor is operated in the normal mode at ambient temperatures (T_Umg) above the target temperature (T_Ziel) and is operated in the continuous mode for a fixed predetermined period of time below the lower temperature limit (T_Grenz).

5. The method as claimed in claim 1, wherein in the case of a re-start of the vehicle, further comprising first carrying out an ambient temperature-dependent and/or an engine temperature-dependent and/or a cooling water temperature-dependent heating phase of the pneumatic system.

6. The method as claimed in claim 1, wherein in an engine braking mode of a vehicle drive engine that is driving the compressor, a current idle phase of the compressor is interrupted.

7. The method as claimed in claim 1, wherein in response to a separate externally triggered request a currently existing idle phase of the compressor is interrupted and the normal mode of the compressor is switched on.

8. The method as claimed in claim 1, further comprising determining a total compressor switch-on duration (ED_soll) for the cold mode depending on the determined temperature difference (ΔT).

9. The method as claimed in claim 1, further comprising detecting an actually completed compressor switch-on duration (ED_ist) for supplying the pneumatic system.

10. A method for operating a pneumatic system of a vehicle with an electronically and/or pneumatically controlled compressor, the compressor being operable in a normal mode in which the compressor supplies compressed air for supplying the pneumatic system, the normal mode being switched off or the compressor being in an idle mode when not supplying compressed air, said method comprising:

detecting an ambient temperature (T_Umg) exterior to the pneumatic system and continuously comparing the ambient temperature (T_Umg) with a predetermined target temperature (T_Ziel), detecting a risk of freezing if the ambient temperature (T_Umg) reaches or drops below the predetermined target temperature (T_Ziel), activating a cold mode upon detecting the risk of freezing, variably controlling a switch-on duration (ED_zus) of the compressor in the cold mode if the ambient temperature (T_Umb) is within a predetermined ambient temperature range, the switch-on duration (ED_zus) being a fixed time period if the ambient temperature (T_Umg) is below the predetermined ambient temperature range, wherein the variably controlled switch-on duration increases from zero to the fixed switch-on duration in proportion to the difference between the ambient temperature (T_Umg) and the predetermined target temperature (T_Ziel), returning the compressor to the idle mode, or switching off the compressor, after the variable switch-on duration and after the fixed switch-on duration.

11. The method as claimed in claim 10, wherein the predetermined ambient temperature range is determined depending on a temperature difference (ΔT) between the ambient temperature (T_Umg) and the target temperature (T_Ziel).

* * * * *